United States Patent
Hamamura et al.

(10) Patent No.: US 12,275,281 B2
(45) Date of Patent: Apr. 15, 2025

(54) PNEUMATIC TIRE

(71) Applicant: SUMITOMO RUBBER INDUSTRIES, LTD., Hyogo (JP)

(72) Inventors: Kenji Hamamura, Hyogo (JP); Hiroki Kawai, Hyogo (JP); Subaru Toya, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 17 days.

(21) Appl. No.: 18/017,785

(22) PCT Filed: Jul. 21, 2021

(86) PCT No.: PCT/JP2021/027376
§ 371 (c)(1),
(2) Date: Jan. 24, 2023

(87) PCT Pub. No.: WO2022/024933
PCT Pub. Date: Feb. 3, 2022

(65) Prior Publication Data
US 2023/0286321 A1 Sep. 14, 2023

(30) Foreign Application Priority Data
Jul. 28, 2020 (JP) .............................. 2020-127600

(51) Int. Cl.
*B60C 3/04* (2006.01)
*B60C 1/00* (2006.01)
*B60C 11/00* (2006.01)
*B60C 11/03* (2006.01)

(52) U.S. Cl.
CPC .............. *B60C 3/04* (2013.01); *B60C 1/0016* (2013.01); *B60C 11/0058* (2013.01); *B60C 11/033* (2013.01); *B60C 2011/0033* (2013.01); *B60C 2011/0341* (2013.01); *B60C 2011/0358* (2013.01)

(58) Field of Classification Search
CPC ......... B60C 11/0058; B60C 2011/0033; B60C 19/082
See application file for complete search history.

(56) References Cited

U.S. PATENT DOCUMENTS

| | | | | |
|---|---|---|---|---|
| 5,309,963 A | * | 5/1994 | Kakumu | B60C 11/033 152/902 |
| 5,370,167 A | * | 12/1994 | Kogure | B60C 9/18 152/537 |
| 2005/0034797 A1 | * | 2/2005 | Nanni | B60C 11/0083 152/209.8 |
| 2014/0138003 A1 | * | 5/2014 | Kuwayama | B60C 3/04 152/454 |
| 2017/0021669 A1 | | 1/2017 | Kuwayama et al. | |
| 2018/0272800 A1 | | 9/2018 | Kuwayama et al. | |
| 2020/0032037 A1 | | 1/2020 | Takano et al. | |

FOREIGN PATENT DOCUMENTS

| | | | |
|---|---|---|---|
| JP | 07-108805 | | 4/1995 |
| JP | 07-108805 A | | 4/1995 |
| JP | 2000052713 A | * | 2/2000 |
| JP | 2006-001299 A | | 1/2006 |
| JP | 2013-052756 A | | 3/2013 |
| JP | 2017-206194 A | | 11/2017 |
| JP | 2018-178034 A | | 11/2018 |
| JP | 2019-089911 A | | 6/2019 |
| JP | 2019-206643 A | | 12/2019 |
| WO | 2017/043008 A1 | | 3/2017 |
| WO | 2018/186367 A1 | | 10/2018 |

OTHER PUBLICATIONS

Machine Translation: JP-2000052713-A, Araki M, (Year: 2024).*
ISR issued in WIPO Patent Application No. PCT/JP2021/027376, Oct. 12, 2021, translation.
Supplementary European Search Report issued Dec. 20, 2023 in European Application No. 21848884.
Written Opinion issued Dec. 20, 2023 in European Application No. 21848884.

* cited by examiner

*Primary Examiner* — Kendra Ly
(74) *Attorney, Agent, or Firm* — GREENBLUM & BERNSTEIN. P.L.C.

(57) ABSTRACT

A pneumatic tire having a tread, wherein the ground contact surface of the tread is composed of at least two types of rubber compositions different in the thermal conductivity, and the following formulas (1) and (2) are satisfied:

$$1700 \leq (Dt^2 \times \pi/4)/Wt \leq 2827.4 \quad (1)$$

$$[(V+1.5\times 10^7)/Wt] \leq 2.88\times 10^5 \quad (2)$$

where Wt (mm) is the cross-sectional width and Dt (mm) is the outer diameter of the tire when installed on a standardized rim and inflated to an internal pressure of 250 kPa, and V (mm³) is the virtual volume of the space occupied by the tire.

21 Claims, No Drawings

PNEUMATIC TIRE

TECHNICAL FIELD

The present invention relates to a pneumatic tire.

BACKGROUND ART

In recent years, from the viewpoint of increasing interest in environmental issues and economic efficiency, there has been a growing demand for fuel efficiency in automobiles, and there is a strong demand for improved fuel efficiency also in pneumatic tires (hereinafter, simply referred to as "tires") installed in automobiles.

The fuel efficiency of a tire can be evaluated by rolling resistance, and it is known that the smaller the rolling resistance, the better the fuel efficiency of the tire.

Therefore, conventionally, it has been proposed to reduce the rolling resistance by devising the shape of the tire and the formulation of the rubber composition constituting the tread portion of the tire (for example, Patent Documents 1 to 4).

PRIOR ART DOCUMENTS

Patent Document

[Patent Document 1] JP2018-178034A
[Patent Document 2] JP2019-089911A
[Patent Document 3] WO2018/186367A
[Patent Document 4] JP2019-206643A

SUMMARY OF INVENTION

Problem to be Solved by the Invention

However, although the tire manufactured by the above-mentioned conventional technology can reduce the rolling resistance, it cannot be said that the grip performance and durability performance during high-speed running are sufficient.

Accordingly, an object of the present invention is to provide a pneumatic tire that is sufficiently improved in grip performance and durability during high-speed running, and that can exhibit excellent grip performance and excellent durability during high-speed running.

Means for Solving the Problem

The present inventor has diligently studied the solution to the above-mentioned problem, found that the above-mentioned problem can be solved by the invention described below, and has completed the present invention.

A first aspect of the invention is;
a pneumatic tire having a tread portion, wherein
the tread portion has a ground-contacting surface made of at least two types of rubber compositions having different thermal conductivities,
when the cross-sectional width of the tire is Wt (mm), the outer diameter is Dt (mm), and the volume of the space occupied by the tire is the virtual volume V (mm$^3$), when the tire is installed on a standardized rim and the internal pressure is 250 kPa, the tire satisfies following (formula 1) and (formula 2):

$$1700 \leq (Dt^2 \times \pi/4)/Wt \leq 2827.4 \quad \text{(formula 1)}$$

$$[(V+1.5\times10^7)/Wt] \leq 2.88\times10^5 \quad \text{(formula 2)}$$

A second aspect of the invention is the pneumatic tire according to the first aspect, wherein the following (formula 3) is satisfied.

$$1718 \leq (Dt^2 \times \Pi/4)/Wt \leq 2827.4 \quad \text{(formula 3)}$$

A third aspect of the invention is the pneumatic tire according to the first aspect or the second aspect, wherein the following (formula 4) is satisfied.

$$[(V+2.0\times10^7)/Wt] \leq 2.88\times10^5 \quad \text{(formula 4)}$$

A fourth aspect of the invention is the pneumatic tire according to the third aspect, wherein the following (formula 5) is satisfied.

$$[(V+2.5\times10^7)/Wt] \leq 2.88\times10^5 \quad \text{(formula 5)}$$

A fifth aspect of the invention is the pneumatic tire according to any one of the first to fourth aspects, wherein, when the outer diameter of the tire is Dt (mm) and the cross-sectional height of the tire is Ht (mm) when the tire is installed on a standardized rim and the internal pressure is 250 kPa, (Dt-2×Ht) is 470 (mm) or more.

A sixth aspect of the invention is the pneumatic tire according to any one of the first to fifth aspects, which has an aspect ratio of 40% or more.

A seventh aspect of the invention is the pneumatic tire according to the sixth aspect, which has an aspect ratio of 45% or more.

An eighth aspect of the invention is the pneumatic tire according to the seventh aspect, which has an aspect ratio of 47.5% or more.

A ninth aspect of the invention is the pneumatic tire according to the eighth aspect, which has an aspect ratio of 50% or more.

A tenth aspect of the invention is the pneumatic tire according to any one of the first to ninth aspects, wherein, when the thermal conductivity of the rubber composition with the highest thermal conductivity is Ka (W/m·K), and the thermal conductivity of the rubber composition with the lowest thermal conductivity is Kb (W/m·K), among the at least two types of rubber compositions having different thermal conductivities, the following (formula 6) is satisfied.

$$0.11 \leq Ka-Kb \leq 0.24 \quad \text{(formula 6)}$$

An eleventh aspect of the invention is the pneumatic tire according to the tenth aspect, wherein the following (formula 7) is satisfied.

$$Ka-Kb > 0.05 \quad \text{(formula 7)}$$

A twelfth aspect of the invention is the pneumatic tire according to any one of the first to eleventh aspects, wherein when the thermal conductivity of the rubber composition with the highest thermal conductivity is Ka (W/m·K), and the thermal conductivity of the rubber composition with the lowest thermal conductivity is Kb (W/m·K), among the at least two types of rubber compositions having different thermal conductivities, in the tread portion, the ratio Sb (%) of the contact area of the contact portion formed from the rubber composition having the thermal conductivity of Kb to the total contact area is larger than the ratio Sa (%) of the contact area of the contact portion formed from the rubber composition having the thermal conductivity of Ka to the total contact area, and (Sb−Sa)×Wt<3.00×10$^4$ is satisfied.

A thirteenth aspect of the invention is the pneumatic tire according to the twelfth aspect, wherein (Sb−Sa)×Wt<2.50×10$^4$ is satisfied.

A fourteenth aspect of the invention is the pneumatic tire according to any one of the first to thirteenth aspects, wherein loss tangent (30° C. tan δ) measured under the conditions of 30° C., frequency of 10 Hz, initial strain of 5%, and dynamic strain of 1% for the rubber composition with the lowest thermal conductivity among the at least two types of rubber compositions having different thermal conductivities is 0.16 or less.

A fifteenth aspect of the invention is the pneumatic tire according to the fourteenth aspect, wherein the 30° C. tan δ is 0.14 or less.

A sixteenth aspect of the invention is the pneumatic tire according to any one of the first to fifteenth aspects, wherein the following (formula 8) is satisfied, when Td (mm) is the thickness of the tread portion.

$$30° \text{ C. tan } \delta \times Td \geq 1.5 \quad \text{(formula 8)}.$$

A seventeenth aspect of the invention is the pneumatic tire according to the sixteenth aspect, wherein the following (formula 9) is satisfied.

$$30° \text{ C. tan } \delta \times Td \geq 1.8 \quad \text{(formula 9)}.$$

An eighteenth aspect of the invention is the pneumatic tire according to any one of the first to seventeenth aspects, wherein the tread portion has a plurality of circumferential grooves continuously extending in the tire circumferential direction, and the total cross-sectional area of the plurality of circumferential grooves is 10 to 30% of the cross-sectional area of the tread portion.

A nineteenth aspect of the invention is the pneumatic tire according to any one of the first to eighteenth aspects, wherein the tread portion has a plurality of lateral grooves extending in the tire axial direction, and the total volume of the plurality of lateral grooves is 2.0 to 5.0% of the volume of the tread portion.

A twentieth aspect of the invention is the pneumatic tire according to any one of the first to nineteenth aspects, wherein Dt is less than 685 (mm), where Dt (mm) is the outer diameter of the tire when the tire is installed on a standardized rim and the internal pressure is 250 kPa.

A twenty-first aspect of the invention is the pneumatic tire according to any one of the first to twentieth aspects, wherein the cross-sectional width Wt (mm) is less than 205 mm.

A twenty-second aspect of the invention is the pneumatic tire according to the twenty-first aspect, wherein the cross-sectional width Wt (mm) is less than 200 mm.

A twenty-third aspect of the invention is the pneumatic tire according to any one of the first to twenty-second aspects, which is a pneumatic tire for a passenger car.

The Effect of the Invention

According to the present invention, it is possible to provide a pneumatic tire in which the grip performance and durability during high speed running are sufficiently improved, and which can exhibit excellent grip performance and excellent durability during high-speed running.

EMBODIMENTS FOR CARRYING OUT THE INVENTION

[1] Features of the Tire of the Present Invention

First, the features of the tire according to the present invention will be described.

1. Overview

The tire according to the present invention is characterized in that the ground-contacting surface is formed of at least two types of rubber compositions having different thermal conductivities.

The tire according to the present invention is characterized also in that, when the cross-sectional width of the tire is Wt (mm), the outer diameter is Dt (mm), and the volume of the space occupied by the tire is the virtual volume V ($mm^3$), when the tire is installed on a standardized rim and the internal pressure is 250 kPa, the tire satisfies following (formula 1) and (formula 2):

$$1700 \leq (Dt^2 \times \pi/4)/Wt \leq 2827.4 \quad \text{(formula 1)}$$

$$[(V+1.5 \times 10^7)/Wt] \leq 2.88 \times 10^5 \quad \text{(formula 2)}$$

By providing these characteristics, it is possible to provide a pneumatic tire with excellent grip performance and durability during high-speed running.

In the above description, "ground-contacting surface is formed of at least two types of rubber compositions having different thermal conductivities" does not necessarily mean that the tread surface is formed by each rubber composition over the entire circumference of the contact surface of the tread portion. The tread surface may be formed by each rubber composition anywhere on the entire circumference. However, being formed over the entire circumference is preferable.

The term "ground-contacting surface" refers to the contact surface of the tread portion when the tire is installed on a standardized rim and has an internal pressure of 250 kPa and a maximum load capacity or a load close to it is applied.

In the above description, the "standardized rim" is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK". In the case of tires that are not specified in the standard, it refers a rim that can be assembled and can maintain internal pressure, that is, the rim that does not cause air leakage from between the rim and the tire, and has the smallest rim diameter, and then the narrowest rim width.

Further, the outer diameter Dt of the tire is the outer diameter of the tire installed on a standardized rim, having an internal pressure of 250 kPa and in a no-load state. The cross-sectional width Wt (mm) of the tire is the width of tire installed on a standardized rim, having an internal pressure of 250 kPa and in a no-load state, and is the distance excluding patterns, letters, and the like on the tire side from the linear distance between the sidewalls (total width of the tire) including all the patterns, letters and the like on the tire side.

Further, the virtual volume V ($mm^3$) of the tire is, specifically, can be calculated by the following formula:

$$V = [(Dt/2)^2 - \{(Dt/2) - Ht\}^2] \times \pi \times Wt$$

based on the outer diameter of tire Dt (mm), the tire cross-sectional height (distance from the bottom of the bead to the outermost surface of the tread; ½ of the difference between the tire outer diameter and the nominal rim diameter) Ht (mm), and the cross-sectional width of tire Wt (mm), in the state the tire is installed on a standardized rim, the internal pressure is 250 kPa and no load is applied.

2. Mechanism of Effect Manifestation in Tire According to the Present Invention

The mechanism of effect manifestation in the tire according to the present invention, that is, the mechanism by which the grip performance and durability performance during high-speed running are sufficiently exhibited, is presumed as follows.

As described above, in the present invention, the cross-sectional width Wt (mm) and the outer diameter Dt (mm) of the tire is tried to satisfy $1700 \leq (Dt^2 \times \pi/4)/Wt \leq 2827.4$ (formula 1). It is preferable to satisfy $1718 \leq (Dt^2 \times \pi/4)/Wt \leq 2827.4$ (formula 3). $(Dt^2 \times \pi/4)$ is more preferably 1865 or more, further preferably 1963.5 or more, and even more preferably 2018 or more.

In (formula 1), $(Dt^2 \times \pi/4)/Wt$ is more preferably 1728 or more, further preferably 1731 or more, further preferably 1745 or more, further preferably 1747 or more, further preferably 1751 or more, further preferably 1753 or more, further preferably 1763 or more, further preferably 1805 or more, further preferably 1811 or more, further preferably 1829 or more, further preferably 1833 or more, further preferably 1860 or more, further preferably 2004 or more, further preferably 2019 or more, further preferably 2021 or more, further preferably 2039 or more, and further preferably 2131 or more.

By increasing $[(Dt/2)^2 \times \pi) = (Dt^2 \times \pi/4)]$, the area when the tire is viewed from the lateral direction, with respect to the cross-sectional width Wt of the tire, and satisfying the numerical range specified in formula 1, the repetition of deformation per unit time is reduced, as a result, the time that can be used for heat exchange is increased, thereby improving the heat release property of the side portion and improving the durability and low rolling resistance.

However, such a tire has a large centrifugal force during rolling, so the radius of the tire increases greatly during rolling, which may lead to non-uniform contact pressure. Particularly, as the running speed increases, the centrifugal force further increases, which may cause further non-uniformity in the contact pressure, resulting in a decrease in grip performance.

Therefore, in the present invention, the virtual volume V (mm³) and the cross-sectional width Wt (mm) of the tire are tried to satisfy $[(V+1.5 \times 10^7)/Wt] \leq 2.88 \times 10^5$ (formula 2).

In this way, by reducing the virtual volume V of the tire in accordance with the reduction in the cross-sectional width Wt of the tire and reducing the volume of the tire itself, it is possible to reduce the growth rate of the outer diameter due to centrifugal force, and it is considered that non uniform ground contact pressure can be suppressed.

$[(V+1.5 \times 10^7)/Wt]$ is more preferably $2.87 \times 10^5$ or less, further preferably $2.85 \times 10^5$ or less, further preferably $2.80 \times 10^5$ or less, further preferably $2.59 \times 10^5$ or less, further preferably $2.55 \times 10^5$ or less, further preferably $2.54 \times 10^5$ or less, further preferably $2.51 \times 10^5$ or less, further preferably $2.48 \times 10^5$ or less, further preferably $2.41 \times 10^5$ or less, further preferably $2.25 \times 10^5$ or less, further preferably $2.23 \times 10^5$ or less, further preferably $2.21 \times 10^5$ or less, further preferably $2.20 \times 10^5$ or less, further preferably $2.19 \times 10^5$ or less, further preferably $2.18 \times 10^5$ or less, and further preferably $2.16 \times 10^5$ or less.

In the present invention, the contact surface of the tread portion is made of at least two types of rubber compositions having different thermal conductivities. As a result, heat flow occurs in the tread portion, so it is considered that deformation of the entire tread can be suppressed.

Based on these results, it is considered that the decrease in grip performance during high-speed running can be sufficiently suppressed.

At this time, it is more preferable that $[(V+2.0 \times 10^7)/Wt] \leq 2.88 \times 10^5$ (formula 4), and further preferable that $[(V+2.5 \times 10^7)/Wt] \leq 2.88 \times 10^5$ (Formula 5).

The above $[(V+2.0 \times 10^7)/Wt]$ is further preferably $2.81 \times 10^5$ or less, further preferably $2.80 \times 10^5$ or less, further preferably $2.79 \times 10^5$ or less, further preferably $2.75 \times 10^5$ or less, further preferably $2.63 \times 10^5$ or less, further preferably $2.48 \times 10^5$ or less, further preferably $2.47 \times 10^5$ or less, further preferably $2.46 \times 10^5$ or less, further preferably $2.45 \times 10^5$ or less, further preferably $2.44 \times 10^5$ or less, and further preferably $2.43 \times 10^5$ or less.

Further, $[(V+2.5 \times 10^7)/Wt]$ is further preferably $2.85 \times 10^5$ or less, further preferably $2.77 \times 10^5$ or less, further preferably $2.75 \times 10^5$ or less, further preferably $2.73 \times 10^5$ or less, further preferably $2.71 \times 10^5$ or less, further preferably $2.69 \times 10^5$ or less, further preferably $2.68 \times 10^5$ or less, and further preferably $2.67 \times 10^5$ or less.

[2] More Preferable Embodiment of the Tire According to the Present Invention

The tire according to the present invention can obtain a larger effect by taking the following embodiment.

1. Aspect Ratio

The tire according to the present invention is preferably a tire having an aspect ratio of 40% or more. As a result, the area of the side portion can be increased, so the heat release property of the entire tire can be further improved, the decrease in rigidity in the tread and side portions can be suppressed, and decrease in grip performance at high-speed running can be further suppressed.

The aspect ratio (%) described above can be obtained by the following formula using the cross-sectional height Ht (mm) and the cross-sectional width Wt (mm) of the tire when the internal pressure is 250 kPa.

$(Ht/Wt) \times 100 (\%)$

The aspect ratio is more preferably 44% or more, further preferably 45% or more, further preferably 47.5% or more, further preferably 48% or more, further preferably 49% or more, further preferably 50% or more, further preferably 52.5% or more, further preferably 53% or more, further preferably 55% or more, further preferably 58% or more, and further preferably 59% or more. There is no particular upper limit, but for example, it is 100% or less.

2. Thermal Conductivity

As described above, by forming the contact surface of the tread portion with at least two types of rubber compositions having different thermal conductivities, it is possible to generate heat flow within the tread portion and suppress deformation of the entire tread.

At this time, in at least two types of rubber compositions having different thermal conductivities, when the thermal conductivity of the rubber composition with the highest thermal conductivity is Ka (W/m·K), and the rubber composition with the lowest thermal conductivity is Kb (W/m·K), the larger (Ka−Kb) is, the more heat flows in the contact surface of the tread portion, which is preferable because the heat dissipation can be enhanced. Specifically, Ka−Kb>0.01 is preferable, Ka−Kb≥0.02 is more preferable, Ka−Kb>0.05 is further preferable, Ka−Kb≥0.08 is further preferable, Ka−Kb>0.10 is further preferable, Ka−Kb≥0.11 is further preferable, and Ka−Kb≥0.24 is further preferable.

Although the upper limit of (Ka−Kb) is not particularly defined, it is preferably about 0.80.

Specifically, Ka is preferably 0.3 to 0.9 W/m·K, and Kb is preferably 0.1 to 0.7 W/m·K.

The thermal conductivity K (W/m·K) is a value measured according to the hot wire method specified in JIS R 2616 (measurement temperature: 23° C.). Specifically, it can be measured using a rapid thermal conductivity meter such as "kemtherm QTM-500" manufactured by Kyoto Electronics Industry Co., Ltd. or a thermal conductivity measuring device such as "TCM1001" manufactured by Lesca Corporation.

The thermal conductivity can be adjusted by adjusting the compounding ratio of carbon black, silica, etc. among compounding materials described later. Also, it can be adjusted by newly compounding graphene, graphite, carbon nanofiber, or the like.

3. Contact Area of Each Rubber Composition

It is considered that the wider the tire width, the greater the contact pressure at the tread center portion, and the greater the difference from the contact pressure at the tread shoulder portions. In this case, the shoulder region of the tread may be made of a rubber composition with the highest thermal conductivity Ka. Considering efficient heat dissipation by grounding, it is preferable to form center region of the tread widely of the rubber composition with thermal conductivity Ka, and the wider the tire, the more preferable it is to make it wider.

However, when the ratio of the contact area of the grounding portion formed from the rubber composition with the highest thermal conductivity Ka to the total grounding area is Sa (%), and the ratio of the contact area formed from the rubber composition with the lowest thermal conductivity Kb to the total grounding area is Sb (%), and when S is increased, it becomes difficult to concentrate heat, and efficient heat dissipation cannot be achieved. Sa must be smaller (about 0.1 to 30%) than Sb.

More specifically, Sb−Sa is more preferably 88% or more, further preferably 90% or more, further preferably 92% or more, and further preferably 94% or more.

Therefore, when the relationship between Sa and Sb and Wt was specifically examined, it was found that (Sb−Sa)×Wt<3.00×$10^4$ is preferable, (Sb−Sa)×Wt≤2.50×$10^4$ is more preferable, (Sb−Sa)×Wt≤2.19×$10^4$ is further preferable, (Sb−Sa)×Wt≤2.18×$10^4$ is further preferable, (Sb−Sa)×Wt≤2.17×$10^4$ is further preferable, (Sb−Sa)×Wt≤2.11×$10^4$ is further preferable, and (Sb−Sa)×Wt≤2.04×$10^4$ is further preferable.

(Sb−Sa)×Wt<2.00×$10^4$ is further preferable, (Sb−Sa)×Wt≤1.89×$10^4$ is further preferable, (Sb−Sa)×Wt≤1.88×$10^4$ is further preferable, (Sb−Sa)×Wt≤1.85×$10^4$ is further preferable, (Sb−Sa)×Wt≤1.80×$10^4$ is further preferable, (Sb−Sa)×Wt≤1.76×$10^4$ is further preferable, (Sb−Sa)×Wt≤1.72×$10^4$ is further preferable, (Sb−Sa)×Wt≤1.67×$10^4$ is further preferable, (Sb−Sa)×Wt≤1.63×$10^4$ is further preferable, (Sb−Sa)×Wt≤1.62×$10^4$ is further preferable, and (Sb−Sa)×Wt≤1.54×$10^4$ is further preferable.

Each of the above formulas should be satisfied when measured at any of the tread circumferences. It is preferable that it is satisfied at the whole circumference.

4. Loss Tangent (Tan δ) of Rubber Composition

In the tire according to the present invention, the loss tangent (30° C. tan δ), measured under the conditions of 30° C., frequency of 10 Hz, initial strain of 5%, and dynamic strain of 1%, of the rubber composition with the lowest thermal conductivity among the at least two types of rubber compositions with different thermal conductivities is, for example, preferably 0.1 or more and 0.7 or less, and more preferably 0.16 or less.

Thus, when the 30° C. tan δ of the rubber composition with the lowest thermal conductivity is reduced to 0.16 or less, the heat generation in the tread portion can be reduced, and the temperature rise of the tire can be suppressed. As a result, the deterioration of the durability of the rubber composition itself and the growth of the outer diameter due to the temperature rise are suppressed and the tire is prevented from being damaged, and the durability improves. In addition, it is more preferable 0.14 or less. The measurement of 30° C. tan δ is carried out on rubber cut from at least the radially outer side of the groove bottom of the tire, preferably from the radially outer side of the half depth of the deepest circumferential groove. Specifically, for example, it can be measured using a viscoelasticity measuring device of "Eplexor (registered trademark)" manufactured by GABO.

In addition, when the thickness of the tread portion is Td (mm), it is preferable to satisfy 30° C. tan δ×Td≥1.5 (formula 8), and satisfying 30° C. tan δ×Td≥1.8 (formula 9) is more preferable, and satisfying 30° C. tan δ×Td≥2.0 is further preferable. By satisfying such a formula, the effects of the present invention can be exhibited more fully. The thickness Td of the tread portion is the distance (mm) from the outermost surface of the tread center portion to the cord layer, and is specifically, for example, 4 mm or more and 25 mm or less.

5. Tread Groove

The tire according to the present invention has a circumferential groove continuously extending in the tire circumferential direction in the tread portion. The ratio of the groove width $L_{80}$ at a depth of 80% of the maximum depth of the circumferential groove to the groove width $L_0$ of the circumferential groove on the ground contact surface of the tread portion ($L_{80}/L_0$) is preferably 0.3 to 0.7. As a result, it is possible to suppress the movement of the entire land portion on the bottom surface of the land portion of the tread portion, so it is considered that the occurrence of chipping in the tread portion can be suppressed. The ratio is more preferably 0.35 to 0.65, further preferably 0.40 to 0.60, and particularly preferably 0.45 to 0.55.

The above-mentioned $L_0$ and $L_{80}$ refer to the linear distance ($L_0$) between the groove edges on the tread surface of the tread circumferential groove of a tire, and to the minimum distance ($L_{80}$) between the groove walls at a position where the groove depth is 80%, respectively, in a state where the tire is installed on a standardized rim, the internal pressure is 250 kPa, and no load is applied. To put it simply, they can be obtained by putting the bead portion of the section cut out in the radial direction with a width of 2 to 4 cm in a pressed state according to the rim width.

It is preferable that the tread portion has a plurality of circumferential grooves, and the total cross-sectional area of the plurality of circumferential grooves is 10 to 30% of the cross-sectional area of the tread portion. It is considered that this makes it possible to suppress the movement of the tread portion, and suppresses the occurrence of chipping in the tread portion. It is more preferably 15 to 27%, further preferably 18 to 25%, and particularly preferably 21 to 23%. The circumferential grooves may be grooves extending continuously in the tire circumferential direction, and non-linear grooves such as zigzag grooves and wavy grooves are also included in the circumferential grooves.

The cross-sectional area of the circumferential groove refers to the total value of the area composed of a straight line connecting the ends of the tread circumferential groove and a groove wall in a tire installed on a standardized rim, having an internal pressure of 250 kPa and in a no-load state. To put it simply, they can be obtained by putting the bead portion of the section cut out in the radial direction with a width of 2 to 4 cm in a pressed state according to the rim width.

Further, it is preferable that the a plurality of lateral grooves extending in the tire axial direction are formed at the tread portion, and the total volume of the plurality of lateral grooves is 2.0 to 5.0% of the volume of the tread portion. It is considered that this makes it possible to suppress the movement of the tread portion, and suppress the occurrence of chipping in the tread portion. It is more preferably 2.2 to 4.0%, further preferably 2.5 to 3.5%, and particularly preferably 2.7 to 3.0%.

The volume of the lateral groove described above refers to the total volume of the volume composed of the surface connecting the ends of the lateral groove and the groove wall in a tire installed on a standardized rim, having an internal pressure of 250 kPa and in a no-load state. To put it simply, it can be obtained by calculating the volume of each lateral groove and multiplying it by the number of grooves, in a state where the bead portion of the section cut out in the radial direction with a width of 2 to 4 cm is pressed down according to the rim width. Further, the volume of the tread portion can be calculated by calculating the area of the portion excluding the lateral groove from the section and multiplying it by the outer diameter, then obtaining the difference between the calculation result and the volume of the lateral groove.

In order to suppress chipping in the tread portion and further improve the durability, it is preferred that these lateral grooves contain a groove having a groove width ratio (Gw/Gd), i.e. ratio of groove width Gw to groove depth Gd, of 0.50 to 0.80. The ratio is more preferably 0.53 to 0.77, further preferably 0.55 to 0.75, and particularly preferably 0.60 to 0.70.

The groove width and groove depth of the lateral groove described above refer to the maximum length of the straight lines connecting the tread surface ends of the lateral groove, which are perpendicular to the groove direction, and to the maximum depth of the lateral groove, respectively, in the tire in a state where the internal pressure is 250 kPa and no load is applied. To put it simply, it can be calculated in a state where the bead portion of the section cut out in the radial direction with a width of 2 to 4 cm is put down in a pressed state according to the rim width.

6. Tire Shape

In the tire according to the present invention, when the tire is installed on a standardized rim and the internal pressure is 250 kPa, the specific outer diameter Dt (mm) is preferably, for example, 515 mm or more, more preferably 558 mm or more, further preferably 585 mm or more, further preferably 650 mm or more, further preferably 658 mm or more, further preferably 663 mm or more, further preferably 664 mm or more, further preferably 665 mm or more, further preferably 672 mm or more, and most preferably 673 mm or more.

On the other hand, it is preferably less than 843 mm, more preferably 735 mm or less, further preferably less than 725 mm, further preferably 718 mm or less, further preferably 717 mm or less, further preferably 716 mm or less, further preferably 713 mm or less, further preferably 709 mm or less, further preferably less than 707 mm, further preferably 693 mm or less, further preferably 690 mm or less, further preferably less than 685 mm, further preferably 684 mm or less, further preferably 679 mm or less, further preferably 678 mm or less, and further preferably 674 mm or less.

The specific cross-sectional width Wt (mm) is preferably 115 mm or more, more preferably 130 mm or more, further preferably 150 mm or more, still more preferably 170 mm or more, still more preferably 175 mm or more, still more preferably 176 mm or more, still more preferably 177 mm or more, still more preferably 181 mm or more, and still more preferably 182 mm, particularly preferably 185 mm or more, and most preferably 193 mm or more.

On the other hand, it is preferably less than 305 mm, more preferably less than 245 mm, further preferably 232 mm or less, further preferably 231 mm or less, further preferably 230 mm or less, further preferably 229 mm or less, further preferably 226 mm or less, further preferably less than 210 mm, further preferably less than 205 mm, further preferably 201 mm or less, further preferably 200 mm or less, further preferably less than 200 mm, and further preferably 199 mm or less.

The specific cross-sectional height Ht (mm) is, for example, preferably 37 mm or more, more preferably 69 mm or more, further preferably 70 mm or more, further preferably 71 mm or more, further preferably 77 mm or more, further preferably 78 mm or more, further preferably 79 mm or more, further preferably 80 mm or more, further preferably 81 mm or more, further preferably 87 mm or more, further preferably 91 mm or more, further preferably 95 mm or more, further preferably 97 mm or more, further preferably 98 mm or more, and further preferably 99 mm or more.

On the other hand, it is preferably less than 180 mm, more preferably 116 mm or less, further preferably 114 mm or less, further preferably less than 112 mm, further preferably 106 mm or less, further preferably less than 101 mm, and further preferably 100 mm or less.

The specific virtual volume V is preferably 13,000,000 $mm^3$ or more, more preferably 23,225,099 $mm^3$ or more, further preferably 23,279,803 $mm^3$ or more, more preferably 23,332,669 $mm^3$ or more, more preferably 28,653,292 $mm^3$ or more, more preferably 28,719,183 $mm^3$ or more, more preferably 28,783,303 $mm^3$ or more, further preferably 29,000,000 $mm^3$ or more, more preferably 29,988,186 $mm^3$ or more, more preferably 30,346,008 $mm^3$ or more, more preferably 34,384,955 $mm^3$ or more, more preferably 35,622,714 $mm^3$ or more, more preferably 35,835,871 $mm^3$ or more, further preferably 36,000,000 $mm^3$ or more, further preferably 36, 200, 312 $mm^3$, further preferably 36, 300, 653 $mm^3$ or more, and further preferably 36,878,037 $mm^3$ or more.

On the other hand, it is preferably less than 66,000,000 $mm^3$, more preferably 51,413,226 $mm^3$ or less, further preferably less than 44,000,000 $mm^3$, further preferably 43,419,514 $mm^3$ or less, further preferably 42,160,723 $mm^3$ or less, further preferably 40,613,053 $mm^3$ or less, and further preferably less than 38,800,000 $mm^3$.

Further, in the present invention, considering the stability of the riding comfort during running, (Dt−2×Ht) is preferably 450 (mm) or more, more preferably 456 (mm) or more, further preferably 458 (mm) or more, further preferably 470 (mm) or more, further preferably 480 (mm) or more, further preferably 481 (mm) or more, and further preferably 482 (mm) or more.

On the other hand, considering the deformation of the tread portion, it is preferably less than 560 (mm), more preferably 559 (mm) or less, further preferably 556 (mm) or less, further preferably 534 (mm) or less, further preferably 531 (mm) or less, further preferably less than 530 (mm), further preferably 510 (mm) or less, further preferably less than 510 (mm), further preferably 509 (mm) or less, further preferably 507 (mm) or less, and further preferably 506 (mm) or less.

[3] Embodiment

Hereinafter, the present invention will be specifically described based on the embodiments.

1. Rubber Composition Forming the Tread Portion

The rubber composition forming the tread portion of the tire according to the present invention can be obtained by appropriately adjusting the type and amount of various compounding materials such as rubber components, fillers, softeners, vulcanizing agents and vulcanization accelerators described below, particularly fillers and softeners.

(1) Rubber Component

In the present embodiment, as the rubber component, rubber (polymer) generally used for producing tires such as butadiene rubber (BR), styrene-butadiene rubber (SBR), isoprene-based rubber, and nitrile rubber (NBR) can be used. Among these, it is preferable to use isoprene-based rubber, butadiene rubber (BR), and styrene butadiene rubber (SBR).

(a) Isoprene Rubber

The content (total content) of the isoprene-based rubber in 100 parts by mass of the rubber component is preferably 25 parts by mass or more, more preferably 35 parts by mass or more, and further preferably 45 parts by mass or more. On the other hand, it is preferably 75 parts by mass or less, more preferably 65 parts by mass or less, and further preferably 55 parts by mass or less.

Examples of the isoprene-based rubber include natural rubber (NR), isoprene rubber (IR), reformed NR, modified NR, and modified IR. NR is preferable from the viewpoint of excellent strength.

As the NR, for example, SIR20, RSS #3, TSR20 and the like, which are common in the tire industry, can be used. The IR is not particularly limited, and for example, IR 2200 and the like, which are common in the tire industry, can be used. Reformed NR includes deproteinized natural rubber (DPNR), high-purity natural rubber (UPNR), and the like. Modified NR includes epoxidized natural rubber (ENR), hydrogenated natural rubber (HNR), grafted natural rubber, and the like. Modified IR includes epoxidized isoprene rubber, hydrogenated isoprene rubber, grafted isoprene rubber, and the like. These may be used alone or in combination of two or more.

(b) BR

The content of BR in 100 parts by mass of the rubber component is preferably 20 parts by mass or more, more preferably 30 parts by mass or more, and further preferably 35 parts by mass or more. On the other hand, it is preferably 60 parts by mass or less, more preferably 50 parts by mass or less, and further preferably 45 parts by mass or less.

The weight average molecular weight of BR is, for example, more than 100,000 and less than 2,000,000. The vinyl bond amount of BR is, for example, more than 1% by mass and less than 30% by mass. The cis content of BR is, for example, more than 1% by mass and less than 98% by mass. The trans amount of BR is, for example, more than 1% by mass and less than 60% by mass. The cis content can be measured by infrared absorption spectrometry.

BR is not particularly limited, and BR with high cis content (90% or more of cis content), BR with low cis content, BR containing syndiotactic polybutadiene crystals, and the like can be used. BR may be either unmodified BR or modified BR. As modified BR, for example, BR modified with a compound (modifying agent) represented by the following formula can be used.

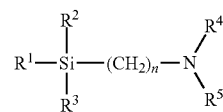

[Chemical 1]

In the formula, $R^1$, $R^2$ and $R^3$ represent, the same or different, alkyl group, alkoxy group, silyloxy group, acetal group, carboxyl group (—COOH), mercapto group (—SH) or derivatives thereof. $R^4$ and $R^5$ represent, the same or different, hydrogen atoms or alkyl groups. $R^4$ and $R^5$ may be combined to form a ring structure with nitrogen atoms. n represents an integer.

As the modified BR modified with the compound (modifier) represented by the above formula, a BR whose polymer terminal (active terminal) has been modified with the compound represented by the above formula can be used.

As $R^1$, $R^2$ and $R^3$, an alkoxy group is preferable (preferably an alkoxy group having 1 to 8 carbon atoms, more preferably an alkoxy group having 1 to 4 carbon atoms) As $R^4$ and $R^5$, an alkyl group (preferably an alkyl group having 1 to 3 carbon atoms) is preferable. n is preferably 1 to 5, more preferably 2 to 4, and even more preferably 3. Further, when $R^4$ and $R^5$ are bonded to form a ring structure together with a nitrogen atom, a 4- to 8-membered ring is preferable. The alkoxy group also includes a cycloalkoxy group (for example, cyclohexyloxy group) and an aryloxy group (for example, phenoxy group, benzyloxy group).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified BR, a modified BR modified with the following compound (modifying agent) can also be used. Examples of the modifying agent include polyglycidyl ethers of polyhydric alcohols such as ethylene glycol diglycidyl ether, glycerin triglycidyl ether, trimethylolethanetriglycidyl ether, and trimethylolpropane triglycidyl ether;

polyglycidyl ethers of aromatic compounds having two or more phenol groups such as diglycidylated bisphenol A;

polyepoxy compounds such as 1,4-diglycidylbenzene, 1,3,5-triglycidylbenzene, and polyepoxidized liquid polybutadiene;

epoxy group-containing tertiary amines such as 4,4'-diglycidyl-diphenylmethylamine, and 4,4'-diglycidyl-dibenzylmethylamine;

diglycidylamino compounds such as diglycidylaniline, N,N'-diglycidyl-4-glycidyloxyaniline, diglycidyl orthotoluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis-(1-methylpropyl) carbamate chloride, 4-morpholincarbonyl chloride, 1-pyrrolidincarbonyl chloride, N,N-dimethylcarbamide acid chloride, and N,N-diethylcarbamide acid chloride;

epoxy group-containing silane compounds such as 1,3-bis-(glycidyloxypropyl)-tetramethyldisiloxane, and (3-glycidyloxypropyl)-pentamethyldisiloxane;

sulfide group-containing silane compound such as (trimethylsilyl) [3-(trimethoxysilyl) propyl] sulfide, (trimethylsilyl) [3-(triethoxysilyl) propyl]sulfide, (trimethylsilyl) [3-(tripropoxysilyl) propyl] sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;

N-substituted aziridine compound such as ethyleneimine and propyleneimine;

alkoxysilanes such as methyltriethoxysilane, N,N-bis (trimethylsilyl)-3-aminopropyltrimethoxysilane, N,N-bis (trimethylsilyl)-3-aminopropyltriethoxysilane, N,N-bis (trimethylsilyl) aminoethyltrimethoxysilane, and N,N-bis (trimethylsilyl) aminoethyltriethoxysilane;

(thio) benzophenone compound having an amino group and/or a substituted amino group such as 4-N,N-dimethylaminobenzophenone, 4-N, N-di-t-butylaminobenzophenone, 4-N,N-diphenylamino benzophenone, 4,4'-bis (dimethylamino) benzophenone, 4,4'-bis (diethylamino) benzophenone, 4,4'-bis (diphenylamino) benzophenone, and N,N,N',N'-bis-(tetraethylamino) benzophenone;

benzaldehyde compounds having an amino group and/or a substituted amino group such as 4-N,N-dimethylaminobenzaldehyde, 4-N, N-diphenylaminobenzaldehyde, and 4-N,N-divinylamino benzaldehyde;

N-substituted pyroridone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;

N-substituted piperidone such as methyl-2-piperidone, N-vinyl-2-piperidone, and N-phenyl-2-piperidone;

N-substituted lactams such as N-methyl-ε-caprolactam, N-phenyl-ε-caprolactam, N-methyl-ω-laurilolactum, N-vinyl-ω-laurilolactum, N-methyl-β-propiolactam, and N-phenyl-β-propiolactam; and N,N-bis-(2,3-epoxypropoxy)-aniline, 4,4-methylene-bis-(N,N-glycidylaniline), tris-(2,3-epoxypropyl)-1,3,5-triazine-2,4,6-triones, N,N-diethylacetamide, N-methylmaleimide, N,N-diethylurea, 1,3-dimethylethylene urea, 1,3-divinylethyleneurea, 1,3-diethyl-2-imidazolidinone, 1-methyl-3-ethyl-2-imidazolidinone, 4-N,N-dimethylaminoacetophenone, 4-N,N-diethylaminoacetophenone, 1,3-bis (diphenylamino)-2-propanone, and 1,7-bis(methylethylamino)-4-heptanone. The modification with the above compound (modifying agent) can be carried out by a known method.

As BR, for example, products of Ube Industries, Ltd., JSR Corporation, Asahi Kasei Co., Ltd., Nippon Zeon Co., Ltd., etc. can be used.

(c) SBR

The content of SBR in 100 parts by mass of the rubber component is preferably 5 parts by mass or more, more preferably 8 parts by mass or more. On the other hand, it is preferably 20 parts by mass or less, more preferably 15 parts by mass or less.

The weight average molecular weight of SBR is, for example, more than 100,000 and less than 2,000,000. The styrene content of SBR is 5% by mass or more, in particular at least 8% by mass or more. Also, it is preferably less than 35% by mass, more preferably less than 25% by mass, and further preferably less than 15% by mass. The vinyl bond amount (1,2-bonded butadiene unit content) of SBR is, for example, more than 5% by mass and less than 70% by mass. The structural identification of SBR (measurement of styrene content and vinyl bond amount) can be performed using, for example, JNM-ECA series equipment manufactured by JEOL Ltd.

The SBR is not particularly limited, and for example, emulsion-polymerized styrene-butadiene rubber (E-SBR), solution-polymerized styrene-butadiene rubber (S-SBR) and the like can be used. The SBR may be either a non-modified SBR or a modified SBR. These may be used alone or in combination of two or more.

The modified SBR may be any SBR having a functional group that interacts with a filler such as silica. Examples thereof include end-modified SBR (end-modified SBR having the above functional group at the terminal) in which at least one end of the SBR is modified with a compound having the above functional group (modifying agent), main chain modified SBR having the functional group in the main chain, main chain terminal modified SBR having the functional group at the main chain and the terminal (for example, a main chain terminal modified SBR having the above functional group to the main chain and having at least one end modified with the above modifying agent), and end-modified SBR which is modified (coupled) with a polyfunctional compound having two or more epoxy groups in the molecule, and into which an epoxy group or hydroxyl group has been introduced.

As the SBR, for example, SBR manufactured and sold by Sumitomo Chemical Co., Ltd., JSR Corporation, Asahi Kasei Co., Ltd., Nippon Zeon Corporation, etc. can be used. The SBR may be used alone or in combination of two or more.

(d) Other Rubber Components

In the present embodiment, as described above,
, as another rubber component, the rubber composition may contain a rubber (polymer) generally used in the production of tires, such as nitrile rubber (NBR).

(2) Compounding Materials Other than Rubber Components (a) Filler

In the present embodiment, the rubber composition preferably contains a filler. Specific examples of the filler include silica, carbon black, calcium carbonate, talc, alumina, clay, aluminum hydroxide, and mica. Among these, silica and carbon black can be preferably used as the reinforcing agent. When silica is used, it is preferable to use it in combination with a silane coupling agent.

(a-1) Silica

The rubber composition preferably contains silica as a filler reinforcing agent. The BET specific surface area of the silica is preferably more than 140 $m^2/g$, more preferably more than 160 $m^2/g$, from the viewpoint of obtaining good durability performance. On the other hand, from the viewpoint of obtaining good rolling resistance at high-speed running, it is preferably less than 250 $m^2/g$, and more preferably less than 220 $m^2/g$. The above-mentioned BET specific surface area is the value of $N_2SA$ measured by the BET method according to ASTM D3037-93.

When silica is used as the filling reinforcing agent, the content of silica with respect to 100 parts by mass of the rubber component is preferably more than 35 parts by mass, more preferably more than 40 parts by mass. On the other hand, it is preferably 200 parts by mass or less, more preferably 100 parts by mass or less, and further preferably 60 parts by mass or less.

Examples of silica include dry silica (anhydrous silica) and wet silica (hydrous silica). Among them, wet silica is preferable because it has large number of silanol groups.

As the silica, for example, products of Evonik, Degussa, Rhodia, Tosoh Silica Co., Ltd., Solvay Japan Co., Ltd., Tokuyama Corporation, etc. can be used.

(a-2) Silane Coupling Agent

The rubber composition preferably contains a silane coupling agent together with silica. The silane coupling agent is not particularly limited. Examples of the silane coupling agent include sulfide-based ones such as bis(3-triethoxysilylpropyl)tetrasulfide, bis (2-triethoxysilylethyl)tetrasulfide, bis (4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl) trisulfide, bis(3-triethoxysilylpropyl)disulfide, bis(2-triethoxysilylethyl) disulfide, bis(4-triethoxysilylbutyl)disulfide, bis(3-trimethoxysilylpropyl) disulfide, bis(2-trimethoxysilylethyl)disulfide, bis(4-trimethoxysilylbutyl) disulfide, 3-trimethoxysilylpropyl-N,N-dimethylthiocarbamoyltetrasulfide, 2-triethoxysilylethyl-N,N-dimethylthiocarbamoyltetrasulfide, and 3-triethoxysilylpropylmethacrylatemonosulfide;

mercapto-based ones such as 3-mercaptopropyltrimethoxysilane, 2-mercaptoethyltriethoxysilane, and NXT and NXT-Z manufactured by Momentive;

vinyl-based ones such as vinyl triethoxysilane, and vinyl trimethoxysilane;

amino-based ones such as 3-aminopropyltriethoxysilane and 3-aminopropyltrimethoxysilane;

glycidoxy-based ones such as γ-glycidoxypropyltriethoxysilane and γ-glycidoxypropyltrimethoxysilane;

nitro-based ones such as 3-nitropropyltrimethoxysilane, and 3-nitropropyltriethoxysilane; and chloro-based ones such as 3-chloropropyltrimethoxysilane and 3-chloropropyltriethoxysilane. These may be used alone or in combination of two or more.

As the silane coupling agent, for example, products of Degussa, Momentive, Shinetsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass with respect to 100 parts by mass of silica.

(a-3) Carbon Black

The rubber composition preferably contains carbon black. The content of carbon black is, for example, more than 1 part by mass and less than 200 parts by mass, with respect to 100 parts by mass of the rubber component.

The carbon black is not particularly limited, and examples thereof includes furnace black (furnace carbon black) such as SAF, ISAF, HAF, MAF, FEF, SRF, GPF, APF, FF, CF, SCF and ECF; acetylene black (acetylene carbon black); thermal black (thermal carbon black) such as FT and MT; and channel black (channel carbon black) such as EPC, MPC and CC. These may be used alone or in combination of two or more.

Nitrogen adsorption specific surface area ($N_2SA$) of carbon black is, for example, more than 30 $m^2$/g and less than 250 $m^2$/g. The amount of dibutyl phthalate (DBP) absorbed by carbon black is, for example, more than 50 ml/100 g and less than 250 ml/100 g. The nitrogen adsorption specific surface area of carbon black is measured according to ASTM D4820-93, and the amount of DBP absorbed is measured according to ASTM D2414-93.

The specific carbon black is not particularly limited, and examples thereof include N134, N110, N220, N234, N219, N339, N330, N326, N351, N550, and N762. Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

(a-4) Other Fillers

The rubber composition may further contain fillers such as calcium carbonate, talc, alumina, clay, aluminum hydroxide, and mica, which are generally used in the tire industry, in addition to the above-mentioned carbon black and silica. As a filler for adjusting the thermal conductivity of the rubber composition, it is also preferable to use the aforementioned graphene, graphite, carbon nanofiber, or the like. These contents are, for example, more than 0.1 part by mass and less than 200 parts by mass with respect to 100 parts by mass of the rubber component.

(b) Softener

The rubber composition may contain oil (including extender oil), liquid rubber, or the like, as a softener. The total content of these is preferably than 1 part by mass, more preferably more than 8 parts by mass, further preferably more than 10 parts by mass with respect to 100 parts by mass of the rubber component. On the other hand, less than 100 parts by mass is preferable, less than 40 parts by mass is more preferable, and less than 30 parts by mass is further preferable. The oil content also includes the amount of oil contained in rubber (oil spread rubber).

Examples of the oil include mineral oil (generally referred to as process oil), vegetable oil and fat, or a mixture thereof. As the mineral oil (process oil), for example, a paraffinic process oil, an aroma-based process oil, a naphthene process oil, or the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, beni flower oil, sesame oil, olive oil, sunflower oil, palm kernel oil, camellia oil, jojoba oil, macadamia nut oil, and tung oil. These may be used alone or in combination of two or more.

Specific examples of process oil (mineral oil) include products of Idemitsu Kosan Co., Ltd., Sankyo Yuka Kogyo Co., Ltd., Japan Energy Co., Ltd., Olisoy Co., Ltd., H & R Co., Ltd., Toyokuni Seiyu Co., Ltd., Showa Shell Sekiyu Co., Ltd., and Fuji Kosan Co., Ltd.

The liquid rubber mentioned as the softener is a polymer in a liquid state at room temperature (25° C.) and is a polymer having a monomer similar to that of solid rubber as a constituent element. Examples of the liquid rubber include farnesene-based polymers, liquid diene-based polymers, and hydrogenated additives thereof.

The farnesene-based polymer is a polymer obtained by polymerizing farnesene, and has a structural unit based on farnesene. Farnesene includes isomers such as α-farnesene ((3E,7E)-3,7,11-trimethyl-1,3,6,10-dodecatetraene) and β-farnesene (7,11-dimethyl-3-methylene-1,6,10-dodecatorien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-equivalent weight average molecular weight (Mw) measured by gel permeation chromatography (GPC) of, for example, more than $1.0 \times 10^3$ and less than $2.0 \times 10^5$. In the present specification, Mw of the liquid diene polymer is a polystyrene conversion value measured by gel permeation chromatography (GPC).

The content of the liquid rubber (total content of the liquid farnesene-based polymer, the liquid diene-based polymer, etc.) is, for example, more than 1 part by mass and less than 100 parts by mass with respect to 100 parts by mass of the rubber component.

As the liquid rubber, for example, products of Kuraray Co., Ltd. and Clay Valley Co., Ltd. can be used.

(c) Resin Component

Further, the rubber composition preferably contains a resin component, if necessary. The resin component may be solid or liquid at room temperature, and specific resin components include styrene resin, coumarone resin, terpene resin, C5 resin, C9 resin, C5C9 resin, acrylic resin, and the like. Two or more kinds of the resin component may be used in combination. The content of the resin component is preferably more than 2 parts by mass and less than 45 parts by mass, and more preferably less than parts by mass, with respect to 100 parts by mass of the rubber component.

(Styrene Resin)

The styrene resin is a polymer using a styrene monomer as a constituent monomer, and examples thereof include a polymer obtained by polymerizing a styrene monomer as a main component (50% by mass or more). Specifically, it includes homopolymers obtained by individually polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more of the styrene monomers, and, in addition, copolymers obtained by copolymerizing a styrene monomer and other monomers that can be copolymerized with the styrene monomer.

Examples of the other monomers include acrylonitriles such as acrylonitrile and methacrylate; unsaturated carboxylic acids such as acrylic acid and methacrylic acid; unsaturated carboxylic acid esters such as methyl acrylate and methyl methacrylate; dienes such as chloroprene, butadiene, and isoprene, olefins such as 1-butene and 1-pentene; α,β-unsaturated carboxylic acids such as maleic anhydride, and acid anhydrides thereof.

(Coumarone-Based Resin)

As the coumarone-based resin, coumarone-indene resin is preferably used. Coumarone-indene resin is a resin containing coumarone and indene as monomer components constituting the skeleton (main chain) of the resin. Examples of the monomer component contained in the skeleton other than coumarone and indene include styrene, α-methylstyrene, methylindene, and vinyltoluene.

The content of the coumarone-indene resin is, for example, more than 1.0 part by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

(Terpene Resins)

Examples of the terpene resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)_n$, or an oxygen-containing derivative thereof, which is a compound having a terpene classified as monoterpenes $(C_{10}H_{16})$, sesquiterpenes $(C_{15}H_{24})$, diterpenes $(C_{20}H_{32})$, etc. as the basic skeleton. Examples thereof include α-pinene, β-pinene, dipentene, limonene, myrcene, alloocimene, osimene, α-phellandrene, α-terpinene, γ-terpinene, terpinolene, 1,8-cineol, 1,4-cineol, α-terpineol, β-terpineol, and γ-terpineol.

Examples of the polyterpene include terpene resins such as α-pinene resin, β-pinene resin, limonene resin, dipentene resin, and β-pinene/limonene resin, which are made from the above-mentioned terpene compound, as well as a hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and the formalin can be mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone, and indene.

(C5 Resin, C9 Resin, C5C9 Resin)

The "C5 resin" refers to a resin obtained by polymerizing a C5 fraction. Examples of the C5 fraction include petroleum fractions having 4 to 5 carbon atoms such as cyclopentadiene, pentene, pentadiene, and isoprene. As the C5-based petroleum resin, a dicyclopentadiene resin (DCPD resin) is preferably used.

The "C9 resin" refers to a resin obtained by polymerizing a C9 fraction, and may be hydrogenated or modified. Examples of the C9 fraction include petroleum fractions having 8 to 10 carbon atoms such as vinyltoluene, alkylstyrene, indene, and methyl indene. As the specific examples, a coumarone-indene resin, a coumarone resin, an indene resin, and an aromatic vinyl resin are preferably used. As the aromatic vinyl resin, a homopolymer of α-methylstyrene or styrene or a copolymer of α-methylstyrene and styrene is preferable because it is economical, easy to process, and excellent in heat generation. A copolymer of α-methylstyrene and styrene is more preferred. As the aromatic vinyl-based resin, for example, those commercially available from Clayton, Eastman Chemical, etc. can be used.

The "C5C9 resin" refers to a resin obtained by copolymerizing the C5 fraction and the C9 fraction, and may be hydrogenated or modified. Examples of the C5 fraction and the C9 fraction include the above-mentioned petroleum fraction. As the C5C9 resin, for example, those commercially available from Tosoh Corporation, LUHUA, etc. can be used.

(Acrylic Resin)

The acrylic resin is not particularly limited, but for example, a solvent-free acrylic resin can be used.

As the solvent-free acrylic resin, a (meth) acrylic resin (polymer) synthesized by a high-temperature continuous polymerization method (high-temperature continuous lump polymerization method: a method described in U.S. Pat. No. 4,414,370 B, JP 84-6207 A, JP 93-58805 A, JP 89-313522 A, U.S. Pat. No. 5,010,166 B, Toa Synthetic Research Annual Report TREND2000 No. 3, p 42-45, and the like) without using polymerization initiators, chain transfer agents, organic solvents, etc. as auxiliary raw materials as much as possible, can be mentioned. In the present invention, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, etc.), (meth) acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth)acrylic acid or (meth) acrylic acid derivative.

The acrylic resin may be a resin composed of only a (meth) acrylic component or a resin also having a component other than the (meth) acrylic component. Further, the acrylic resin may have a hydroxyl group, a carboxyl group, a silanol group, or the like.

As the polymer component of resin component, for example, a product of Maruzen Petrochemical Co., Ltd., Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Co., Ltd., Nippon Catalyst Co., Ltd., JX Energy Co., Ltd., Arakawa Chemical Industry Co., Ltd., Taoka Chemical Industry Co., Ltd. can be used.

(d) Anti-Aging Agent

The rubber composition preferably contains an anti-aging agent. Content of the anti-aging agent is, for example, more than 1 part by mass and less than 10 parts by mass, with respect to 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis (α,α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate] methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(e) Stearic Acid

The rubber composition may contain stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, NOF Corporation, Kao Corporation, Fuji film Wako Pure Chemical Industries, Ltd., and Chiba Fatty Acid Co., Ltd., etc. can be used.

(f) Zinc Oxide

The rubber composition may contain zinc oxide. Content of zinc oxide is, for example, more than 0.5 parts by mass and less than 10 parts by mass with respect to 100 parts by mass of the rubber component. As the zinc oxide, conventionally known ones can be used, for example, products of Mitsui Metal Mining Co., Ltd., Toho Zinc Co., Ltd., Hakusui Tech Co., Ltd., Shodo Chemical Industry Co., Ltd., Sakai Chemical Industry Co., Ltd., etc. can be used.

(g) Wax

The rubber composition preferably contains wax. Content of the wax is, for example, 0.5 to 20 parts by mass, preferably 1.5 to 15 parts by mass, and more preferably 3.0 to 10.0 parts by mass with respect to 100 parts by mass of the rubber component.

The wax is not particularly limited, and examples thereof include petroleum waxes such as paraffin wax and microcrystalline wax; natural waxes such as plant wax and animal wax; and synthetic waxes such as a polymer of ethylene or propylene. These may be used alone or in combination of two or more.

As the wax, for example, products of Ouchi Shinko Chemical Industry Co., Ltd., Nippon Seiro Co., Ltd., and Seiko Kagaku Co., Ltd. can be used.

(h) Crosslinking Agent and Vulcanization Accelerator

The rubber composition preferably contains a cross-linking agent such as sulfur. Content of the cross-linking agent is, for example, more than 0.1 part by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., DURALINK HTS (1,6-hexamethylene-sodium dithiosulfate dihydrate) manufactured by Flexsys, and KA9188 (1,6-bis (N,N'-dibenzylthiocarbamoyldithio) hexane) manufactured by Lanxess; and organic peroxides such as dicumylperoxide.

The rubber composition preferably contains a vulcanization accelerator. Content of the vulcanization accelerator is, for example, more than 0.3 parts by mass and less than 10.0 parts by mass with respect to 100 parts by mass of the rubber component.

Examples of the vulcanization accelerator include
- thiazole-based vulcanization accelerators such as 2-mercaptobenzothiazole, di-2-benzothiazolyl disulfide, and N-cyclohexyl-2-benzothiadylsulfenamide;
- thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);
- sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, di-ortho-tolylguanidine and ortho-tolylbiguanidine. These may be used alone or in combination of two or more.

(i) Other

In addition to the above components, the rubber composition may further contain additives generally used in the tire industry, such as fatty acid metal salts, carboxylic acid metal salts, organic peroxides, and graphite. Content of these additives is, for example, more than 0.1 part by mass and less than 200 parts by mass with respect to 100 parts by mass of the rubber component.

2. Production of Rubber Composition

The rubber composition is produced by a general method, for example, a manufacturing method including a base kneading step of kneading a rubber component with a filler such as silica or carbon black, and a finish kneading step of kneading the kneaded product obtained in the base kneading step and a cross-linking agent.

The kneading can be performed using a known (sealed) kneader such as a banbury mixer, a kneader, or an open roll.

The kneading temperature of the base kneading step is, for example, higher than 50° C. and lower than 200° C., and the kneading time is, for example, more than 30 seconds and less than 30 minutes. In the base kneading process, in addition to the above components, compounding agents conventionally used in the rubber industry, such as softeners such as oil, stearic acid, zinc oxide, antiaging agents, waxes, and vulcanization accelerators, may be appropriately added and kneaded as needed.

In the finish kneading step, the kneaded product obtained in the base kneading step and the cross-linking agent are kneaded. The kneading temperature of the finish kneading step is, for example, above room temperature and lower than 80° C., and the kneading time is, for example, more than 1 minute and less than 15 minutes. In the finish kneading step, in addition to the above components, a vulcanization accelerator, zinc oxide and the like may be appropriately added and kneaded as needed.

As described above, the thermal conductivity of the rubber composition can be adjusted by adjusting the compounding ratio of carbon black, silica, etc., or by compounding graphene, graphite, carbon nanofiber, etc., in this kneading operation.

3. Tire Manufacturing

The tire of the present invention is manufactured by a usual method using an unvulcanized rubber composition obtained through the finish kneading step. Specifically, first, the unvulcanized rubber composition is extruded according to the shape of each tire member of the tread. At this time, a tread having regions with different thermal conductivities can be obtained by simultaneously extruding rubber compositions having different thermal conductivities.

Next, the tread is molded together with other tire members by a normal method on a tire molding machine to produce an unvulcanized tire. Specifically, on the molded drum, the inner liner as a member to ensure the air-tightness of the tire, the carcass as a member to withstand the load, impact and filling air pressure received by the tire, a belt as a member to strongly tighten the carcass to increase the rigidity of the tread, and the like are wound, both ends of the carcass are fixed to both side edges, a bead part as a member for fixing the tire to the rim is arranged, and they are formed into a toroid shape. Then the tread is pasted on the center of the outer circumference, and the sidewall portion as a member that protects the carcass and resists bending is pasted on the radial outer side to produce an unvulcanized tire.

In the present embodiment, it is preferable to provide with an inclined belt layer that extends at an angle of 15° to 30° with respect to the tire circumferential direction, as the belt. As a result, the durability of the tire is ensured while the rigidity of the tread can be sufficiently maintained. Further, since it can be restrained in the circumferential direction, it becomes easy to suppress the growth of the outer diameter.

Then, the produced unvulcanized tire is heated and pressed in a vulcanizer to obtain a tire. The vulcanization step can be carried out by applying a known vulcanization means. The vulcanization temperature is, for example, higher than 120° C. and lower than 200° C., and the vulcanization time is, for example, more than 5 minutes and less than 15 minutes.

At this time, the tire is formed into a shape that satisfies the above-mentioned (formula 1) and (formula 2), when the tire is installed on a standardized rim and the internal pressure is set to 250 kPa.

Specific tires that can satisfy the above (formula 1) and (formula 2) include tires with size notation of 145/60R18, 145/60R19, 155/55R18, 155/55R19, 155/70R17, 155/70R19, 165/55R20, 165/55R21, 165/60R19, 165/65R19, 165/70R18, 175/55R19, 175/55R20, 175/55R22, 175/60R18, 185/55R19, 185/60R20, 195/50R20, 195/55R20, etc.

In the present embodiment, the tires that can satisfy (formula 1) and (formula 2) are preferably applied to pneumatic tires for passenger cars. Satisfying the above formulas can contribute more favorably to solve the problem in the present invention of providing a pneumatic tire in which not only the rolling resistance is small and the fuel efficiency is excellent, but also the grip performance and durability during high-speed running are improved, and excellent grip performance and durability during high-speed running can be exhibited.

The pneumatic tire for a passenger car referred to here is a tire mounted on a vehicle traveling on four wheels and has a maximum load capacity of 1000 kg or less. Here, the maximum load capacity is the maximum load capacity defined for each tire in the standard system including the standard on which the tire is based. For example, in the case of JATMA standard (Japan Automobile Tire Association standard), it is the maximum load capacity based on load index (LI); in the case of TRA (The Tire and Rim Association, Inc.), it is the maximum value described in "TIRE LOAD LIMITS AT VARIOUS COLD INFRATION PRESSURES"; and in the case of ETRTO, it is "INFRATION PRESSUR".

The maximum load capacity is not particularly limited as long as it is 1000 kg or less. However, in general, the tire weight tends to increase as the maximum load capacity increases, and the braking distance also increases due to inertia accordingly. Therefore, the maximum load capacity is preferably 900 kg or less, more preferably 800 kg or less, and further preferably 700 kg or less.

From the viewpoint of the braking distance due to the inertia described above, the tire weight is preferably 20 kg or less, more preferably 15 kg or less, and further preferably 12 kg or less, 10 kg or less, and 8 kg or less. The tire of the present invention may be provided with electronic components, and in this case, the tire weight referred to here is the weight of the tire including the weights of the electronic components and the electronic component mounting members. If a sealant, sponge or the like is provided in the lumen, the weight of the tire includes them.

EXAMPLES

Hereinafter, the present invention will be described in more specific with reference to Examples. In the following description, two types of rubber compositions having different thermal conductivities were used as the rubber composition forming the tread portion (tread rubber composition).

[Experiment 1]

In this experiment, 175 size tires were prepared and evaluated.

1. Manufacture of Rubber Compositions for Treads

First, a rubber composition for tread was produced.

(1) Compounding Material

First, each compounding material shown below was prepared.

(a) Rubber component
(a-1) NR: TSR20
(a-2) BR: UBEPOL-BR150 manufactured by Ube Kosan Co., Ltd. (cis content: 97 mass %, trans amount: 2 mass %, vinyl bond amount: 1 mass %)
(a-3) SBR: Europrene SOL R C2525 manufactured by Versalis (styrene content: 26% by mass, vinyl bond amount: 24% by mass)

(b) Compounding Materials Other than Rubber Components
(b-1) Carbon black-1: Seast F manufactured by Tokai Carbon Co., Ltd.
(b-2) Carbon black-2: Ketjen Black EC300J manufactured by Ketjen Black International Co., Ltd
(b-3) Silica: Ultrasil VN3 manufactured by Evonik Co., Ltd.
(b-4) Silane coupling agent: Si363 manufactured by Degussa Co., Ltd.
(b-5) Oil: Process oil A/OMIX manufactured by Sankyo Yuka Kogyo Co., Ltd.
(b-6) Wax: Ozoace 0355 manufactured by Nippon Seiro Co., Ltd.
(b-7) Stearic acid: Stearic acid "TSUBAKI" manufactured by NOF CORPORATION
(b-8) Zinc oxide: Zinc white No. 1 manufactured by Mitsui Mining & Smelting Co., Ltd.
(b-9) Anti-aging agent-1: Nocrac 6C manufactured by Ouchi Shinko Chemical Industry Co., Ltd.
(b-10) Crosslinking agent and vulcanization accelerator
Sulfur: Powdered sulfur manufactured by Tsurumi Chemical Industry Co., Ltd.
Vulcanization accelerator-1: Nocceler CZ-G (CBS) manufactured by Ouchi Shinko Chemical Industry Co., Ltd. (N-Cyclohexyl-2-benzothiazolyl sulphenamide)
Vulcanization accelerator-2: Nocceler D (DPG) manufactured by Ouchi Shinko Chemical Industry Co., Ltd. (1,3-Diphenylguanidine)

(2) Production of Rubber Composition with Low Thermal Conductivity

First, using each compounding material described above, base kneading and finish kneading were performed with a composition of 50 parts by mass of NR, 40 parts by mass of BR, 10 parts by mass of SBR, 5 parts by mass of carbon black-1, 0.1 parts by mass of carbon black-2, 50 parts by mass of silica, 4 parts by mass of silane coupling agent, 15 parts by mass of oil, 1.5 parts by mass of wax, 2 parts by mass of stearic acid, 3 parts by mass of zinc oxide, 3 parts by mass of antioxidant, 1.5 parts by mass of sulfur, 1 part by mass of vulcanization accelerator 1, and 0.5 parts by mass of vulcanization accelerator-2, and a rubber composition with low thermal conductivity (Kb: 0.30 W/m·K) was obtained. The loss tangent (30° C. tan δ) of this rubber composition was measured under the conditions of 30° C., a frequency of 10 Hz, an initial strain of 5%, and a dynamic strain rate of 1% using an Eplexor series manufactured by GABO, and it was 0.14.

(b) Production of Rubber Composition with High Thermal Conductivity

Next, using the same compounding materials, except that the amounts of carbon black-1, carbon black-2, and silica were increased as appropriate, base kneading and finish kneading were performed with the same compounding, and four types from A to D of rubber compositions with high conductivity were obtained. The specific thermal conductivity Ka of the rubber compositions A to D is 0.32 W/m·K for the rubber composition A, 0.41 W/m·K for the rubber composition B, and 0.54 W/m·K for the rubber composition C, and 0.38 W/m·K for rubber composition D.

2. Tire Manufacturing

Next, a rubber composition with low thermal conductivity and a rubber composition with high thermal conductivity are used to perform biaxial extrusion molding, so that a tread was obtained in which the difference of the region Sb of the rubber composition with low thermal conductivity and the region Sa of the rubber composition with high thermal conductivity (Sb−Sa) is the values shown in Tables 1 and 2. The resulting tread was pasted with other tire members to form an unvulcanized tire, and press vulcanized for 10 minutes at 170° C. to produce each test tire of size 175 type (Example 1-1 to Example 1-5 and Comparative Examples 1-3 to 1-5). The thickness Td of the tread portion was set to 13 mm (30° C. tan δ×Td=1.82).

In addition, two types of test tires (Comparative Example 1-1 and Comparative Example 1-2) were manufactured using treads formed from only one type of rubber composition.

In each test tire, the above-mentioned ($L_{80}/L_0$) was 0.5, the total cross-sectional area of the circumferential groove was 22% of the cross-sectional area of the tread portion, and the total volume of the lateral grooves including the lateral grooves having the groove width/groove depth of 0.65 was set to 3.5% of the volume of the tread portion.

3. Parameter Calculation

After that, the outer diameter Dt (mm), the cross-sectional width Wt (mm), the cross-sectional height Ht (mm), and the aspect ratio (%) of each test tire were obtained, and the virtual volume V (mm3) was obtained. At the same time, (Ka−Kb) was determined. The results are shown in Tables 1 and 2.

Then, $(Dt-2\times Ht)$, $(Dt^2\times\pi/4)/Wt$, $(V+1.5\times10^7)/Wt$, $(V+2.0\times10^7)/Wt$, $(V+2.5\times10^7)/Wt$, and $(Sb-Sa)\times Wt$ were calculated. The results are shown in Tables 1 and 2.

5. Performance Evaluation Test (1) Evaluation of Grip at High-Speed Running

Each test tire was installed on all wheels of the vehicle (domestic FF vehicle, displacement 2000 cc), filled with air so that the internal pressure became 250 kPa, and then driven on the test course on the dry road surface at a speed of 100 km/h, and the lap time at that time was measured and evaluated. For the evaluation, the difference from the lap time of a separately prepared reference tire was obtained, and the time difference in Comparative Examples 1-5 was set to 100, indexed based on the following formula, and the grip during high-speed running was relatively evaluated. The larger value is, better grip during high-speed running.

Grip at high-speed running=[(lap time of test tire−lap time of reference tire)/(lap time of Comparative Example 1-5−lap time of reference tire)]×100

(2) Evaluation of Durability Performance

After installing each test tire on all wheels of the vehicle (domestic FF vehicle, displacement 2000 cc) and filling it with air so that the internal pressure became 250 kPa, a driving 10 laps at a speed of 50 km/h, followed by climbing onto the unevenness provided on the road surface at a speed of 80 km/h were repeated on the test course on a dry road surface in an overloaded state. Thereafter, the lap was performed again at a speed of 50 km/h and then the speed was gradually increased to measure the speed at the time when the driver felt an abnormality.

Next, the result in Comparative Example 1-5 was set to as 100, and the durability performance was relatively evaluated by indexing based on the following formula. The larger the value, the better the durability.

Durability=[(Result of test tire)/(Result of Comparative Example 1-5)]×100

(3) Comprehensive Evaluation

The evaluation results of (1) and (2) above were totaled to obtain a comprehensive evaluation.

(4) Evaluation Result

The results of each evaluation are shown in Tables 1 and 2. In Comparative Examples 1-1 and 1-2, since the values of (Ka−Kb) and (Sb−Sa) cannot be calculated, the related results are indicated by "−".

TABLE 1

| | Example No. | | | | |
|---|---|---|---|---|---|
| | 1-1 | 1-2 | 1-3 | 1-4 | 1-5 |
| SIZE | 175/40R21 | 175/40R21 | 175/40R21 | 175/50R20 | 175/60R19 |
| Rubber composition with high thermal conductivity | A | B | C | A | A |
| (Parameter) | | | | | |
| Dt(mm) | 672 | 673 | 674 | 684 | 693 |
| V(mm$^3$) | 23225099 | 23279803 | 23332669 | 29988186 | 34384955 |
| Wt(mm) | 177 | 176 | 175 | 182 | 177 |
| Ht(mm) | 69 | 71 | 70 | 87 | 106 |
| Dt-2 × Ht(mm) | 534 | 531 | 534 | 510 | 481 |
| (Dt$^2$ × π/4)/Wt | 2004 | 2021 | 2039 | 2019 | 2131 |
| (V + 1.5 × 10$^7$)/Wt | 215961 | 217499 | 219044 | 247188 | 279011 |
| (V + 2.0 × 10$^7$)/Wt | 244210 | 245908 | 247615 | 274660 | 307260 |
| (V + 2.5 × 10$^7$)/Wt | 272458 | 274317 | 276187 | 302133 | 335508 |
| Aspect ratio (%) | 39 | 40 | 40 | 48 | 59 |
| Ka-Kb | 0.02 | 0.11 | 0.24 | 0.02 | 0.02 |
| Sb-Sa | 94 | 92 | 88 | 94 | 94 |
| (Sb-Sa) × Wt | 16638 | 16192 | 15400 | 17108 | 16638 |
| (Evaluation result) | | | | | |
| Grip at high speed running | 104 | 111 | 118 | 106 | 109 |
| Durability | 112 | 114 | 117 | 109 | 105 |
| Comprehensive evaluation | 216 | 225 | 235 | 215 | 214 |

TABLE 2

| | Comparative example No. | | | | |
|---|---|---|---|---|---|
| | 1-1 | 1-2 | 1-3 | 1-4 | 1-5 |
| SIZE | 175/80R14 | 175/60R19 | 175/80R14 | 175/80R14 | 175/80R14 |
| Rubber composition with high thermal conductivity | — | — | A | B | C |
| (Parameter) | | | | | |
| Dt(mm) | 636 | 693 | 635 | 637 | 636 |
| V(mm$^3$) | 38652508 | 34384955 | 38041064 | 38610099 | 38870883 |
| Wt(mm) | 177 | 177 | 175 | 176 | 178 |
| Ht(mm) | 141 | 105 | 140 | 142 | 140 |
| Dt-2 × Ht(mm) | 354 | 483 | 355 | 353 | 356 |
| (Dt$^2$ × π/4)/Wt | 1795 | 2131 | 1810 | 1811 | 1785 |

TABLE 2-continued

| | Comparative example No. | | | | |
|---|---|---|---|---|---|
| | 1-1 | 1-2 | 1-3 | 1-4 | 1-5 |
| $(V + 1.5 \times 10^7)/Wt$ | 303122 | 279011 | 303092 | 304603 | 302645 |
| $(V + 2.0 \times 10^7)/Wt$ | 331370 | 307260 | 331663 | 333012 | 330735 |
| $(V + 2.5 \times 10^7)/Wt$ | 359619 | 335508 | 360235 | 361421 | 358825 |
| Aspect ratio (%) | 79 | 59 | 80 | 80 | 79 |
| Ka-Kb | — | — | 0.02 | 0.11 | 0.24 |
| Sb-Sa | — | — | 94 | 92 | 88 |
| (Sb-Sa) × Wt | — | — | 16450 | 16192 | 15664 |
| (Evaluation result) | | | | | |
| Grip at high speed running | 90 | 92 | 96 | 98 | 100 |
| Durability | 89 | 92 | 94 | 96 | 100 |
| Comprehensive evaluation | 179 | 184 | 190 | 194 | 200 |

[Experiment 2]

In this experiment, 195 size tires were prepared and evaluated.

After manufacturing test tires of Examples 2-1 to 2-5 and Comparative Examples 2-1 to 2-5 shown in Tables 3 and 4 in the same manner as in Experiment 1, each parameter was obtained. Then, similarly, a performance evaluation test was performed and evaluated. In this experiment, the result in Comparative Example 2-5 was set as 100 for evaluation. The results of each evaluation are shown in Tables 3 and 4.

TABLE 3

| | Example No. | | | | |
|---|---|---|---|---|---|
| | 2-1 | 2-2 | 2-3 | 2-4 | 2-5 |
| SIZE | 195/40R20 | 195/40R20 | 195/40R20 | 195/50R19 | 195/60R18 |
| Rubber composition with high thermal conductivity | A | B | C | A | A |
| (Parameter) | | | | | |
| Dt(mm) | 664 | 663 | 665 | 679 | 690 |
| V(mm³) | 28719183 | 28653292 | 28783303 | 35835871 | 42160723 |
| Wt(mm) | 200 | 201 | 199 | 200 | 201 |
| Ht(mm) | 79 | 77 | 78 | 99 | 116 |
| Dt-2 × Ht(mm) | 506 | 509 | 509 | 481 | 458 |
| $(Dt^2 \times \pi/4)/Wt$ | 1731 | 1718 | 1745 | 1811 | 1860 |
| $(V + 1.5 \times 10^7)/Wt$ | 218596 | 217181 | 220017 | 254179 | 284382 |
| $(V + 2.0 \times 10^7)/Wt$ | 243596 | 242056 | 245142 | 279179 | 309257 |
| $(V + 2.5 \times 10^7)/Wt$ | 268596 | 266932 | 270268 | 304179 | 334133 |
| Aspect ratio (%) | 39 | 39 | 39 | 49 | 58 |
| Ka-Kb | 0.02 | 0.11 | 0.24 | 0.02 | 0.02 |
| Sb-Sa | 94 | 92 | 88 | 94 | 94 |
| (Sb-Sa) × Wt | 18800 | 18492 | 17512 | 18800 | 18894 |
| (Evaluation result) | | | | | |
| Grip at high speed running | 103 | 109 | 117 | 105 | 108 |
| Durability | 111 | 113 | 117 | 110 | 106 |
| Comprehensive evaluation | 214 | 222 | 234 | 215 | 214 |

TABLE 4

| | Comparative example No. | | | | |
|---|---|---|---|---|---|
| | 2-1 | 2-2 | 2-3 | 2-4 | 2-5 |
| SIZE | 195/65R17 | 195/40R20 | 195/65R17 | 195/65R17 | 195/65R17 |
| Rubber composition with high thermal conductivity | — | — | A | B | C |
| (Parameter) | | | | | |
| Dt(mm) | 686 | 664 | 687 | 685 | 686 |
| V(mm³) | 44856521 | 28719183 | 44849025 | 44417998 | 45079688 |
| Wt(mm) | 201 | 200 | 200 | 200 | 202 |
| Ht(mm) | 126 | 77 | 127 | 128 | 127 |
| Dt-2 × Ht(mm) | 434 | 510 | 433 | 429 | 432 |
| $(Dt^2 \times \pi/4)/Wt$ | 1839 | 1731 | 1853 | 1843 | 1830 |

TABLE 4-continued

|  | Comparative example No. | | | | |
|---|---|---|---|---|---|
|  | 2-1 | 2-2 | 2-3 | 2-4 | 2-5 |
| $(V + 1.5 \times 10^7)/Wt$ | 297794 | 218596 | 299245 | 297090 | 297424 |
| $(V + 2.0 \times 10^7)/Wt$ | 322669 | 243596 | 324245 | 322090 | 322177 |
| $(V + 2.5 \times 10^7)/Wt$ | 347545 | 268596 | 349245 | 347090 | 346929 |
| Aspect ratio (%) | 63 | 39 | 64 | 63 | 63 |
| Ka-Kb | — | — | 0.02 | 0.11 | 0.24 |
| Sb-Sa | — | — | 94 | 92 | 88 |
| (Sb-Sa) × Wt | — | — | 18800 | 18400 | 17776 |
| (Evaluation result) | | | | | |
| Grip at high-speed running | 91 | 93 | 97 | 98 | 100 |
| Durability | 90 | 92 | 93 | 94 | 100 |
| Comprehensive evaluation | 181 | 185 | 190 | 192 | 200 |

[Experiment 3]

In this experiment, 225 size tires were prepared and evaluated.

After manufacturing test tires of Examples 3-1 to 3-5 and Comparative Examples 3-1 to 3-5 shown in Tables 5 and 6 in the same manner as in Experiment 1, each parameter was obtained. Then, similarly, a performance evaluation test was performed and evaluated. In this experiment, the result in Comparative Example 3-5 was set as 100 for evaluation. The results of each evaluation are shown in Tables 5 and 6.

TABLE 5

|  | Example No. | | | | |
|---|---|---|---|---|---|
|  | 3-1 | 3-2 | 3-3 | 3-4 | 3-5 |
| SIZE | 225/35R22 | 225/35R22 | 225/35R22 | 225/50R20 | 225/40R21 |
| Rubber composition with high thermal conductivity | A | B | C | A | A |
| (Parameter) | | | | | |
| Dt(mm) | 716 | 717 | 718 | 735 | 713 |
| V(mm³) | 36200312 | 36300653 | 36878037 | 51413226 | 40613053 |
| Wt(mm) | 230 | 229 | 231 | 232 | 231 |
| Ht(mm) | 80 | 79 | 81 | 114 | 91 |
| Dt-2 × Ht(mm) | 556 | 559 | 556 | 507 | 531 |
| $(Dt^2 \times \pi/4)/Wt$ | 1751 | 1763 | 1753 | 1829 | 1728 |
| $(V + 1.5 \times 10^7)/Wt$ | 222610 | 224020 | 224580 | 286264 | 240749 |
| $(V + 2.0 \times 10^7)/Wt$ | 244349 | 245854 | 246225 | 307816 | 262394 |
| $(V + 2.5 \times 10^7)/Wt$ | 266088 | 267688 | 267870 | 329367 | 284039 |
| Aspect ratio (%) | 34 | 35 | 34 | 49 | 39 |
| Ka-Kb | 0.02 | 0.11 | 0.24 | 0.02 | 0.02 |
| Sb-Sa | 94 | 92 | 88 | 94 | 94 |
| (Sb-Sa) × Wt | 21620 | 21068 | 20328 | 21808 | 21714 |
| (Evaluation result) | | | | | |
| Grip at high speed running | 107 | 107 | 107 | 107 | 107 |
| Durability | 110 | 112 | 116 | 107 | 105 |
| Comprehensive evaluation | 212 | 219 | 231 | 211 | 212 |

TABLE 6

|  | Comparative example No. | | | | |
|---|---|---|---|---|---|
|  | 3-1 | 3-2 | 3-3 | 3-4 | 3-5 |
| SIZE | 225/60R20 | 225/50R20 | 225/60R20 | 225/60R20 | 225/60R20 |
| Rubber composition with high thermal conductivity | — | — | A | B | C |
| (Parameter) | | | | | |
| Dt(mm) | 779 | 734 | 777 | 778 | 777 |
| V(mm³) | 63003628 | 51145556 | 62169986 | 61904251 | 61898502 |
| Wt(mm) | 230 | 232 | 229 | 227 | 228 |
| Ht(mm) | 136 | 114 | 134 | 135 | 136 |
| Dt-2 × Ht(mm) | 507 | 506 | 509 | 508 | 505 |
| $(Dt^2 \times \pi/4)/Wt$ | 2072 | 1824 | 2071 | 2094 | 2080 |

TABLE 6-continued

| | Comparative example No. | | | | |
|---|---|---|---|---|---|
| | 3-1 | 3-2 | 3-3 | 3-4 | 3-5 |
| $(V + 1.5 \times 10^7)/Wt$ | 339146 | 285110 | 336987 | 338785 | 337274 |
| $(V + 2.0 \times 10^7)/Wt$ | 360885 | 306662 | 358821 | 360812 | 359204 |
| $(V + 2.5 \times 10^7)/Wt$ | 382624 | 328214 | 380655 | 382838 | 381134 |
| Aspect ratio (%) | 59 | 49 | 59 | 59 | 59 |
| Ka-Kb | — | — | 0.02 | 0.11 | 0.24 |
| Sb-Sa | — | — | 94 | 92 | 88 |
| (Sb-Sa) × Wt | — | — | 21526 | 20884 | 20064 |
| (Evaluation result) | | | | | |
| Grip at high speed running | 92 | 93 | 98 | 99 | 100 |
| Durability | 89 | 91 | 92 | 95 | 100 |
| Comprehensive evaluation | 181 | 184 | 190 | 194 | 200 |

[Summary of Experiments 1 to 3]

From the results of Experiments 1 to 3 (Tables 1 to 6), it was found that, when the above (formula 1) and (formula 2) are satisfied in any size tire of 175 size, 195 size, and 225 size, a pneumatic tire with sufficiently improved grip performance and durability during high-speed running can be provided.

Then, it turns out that, by satisfying each of the requirements specified in claim 2 and thereafter, it is possible to provide a tire with further improved grip and durability at high-speed running.

On the other hand, it turns out that, when either (formula 1) or (formula 2) is not satisfied, the grip and durability during high-speed running cannot be sufficiently improved.

[Experiment 4]

Next, three types of tires (Examples 4-1 to 4-3) with no significant difference in the relationship between the virtual volume V and the cross-sectional width Wt were produced with the same formulation and evaluated in the same manner. Here, in addition to evaluation of grip and durability during high-speed running, fuel efficiency was also evaluated.

Specifically, each test tire was installed on all wheels of a vehicle (domestic FF vehicle, displacement 2000 cc), and after filling air so that the internal pressure was 250 kPa, the tire was run on a dry road test course. After making 10 km laps at a speed of 100 km/h, the accelerator was released, and the distance from when the accelerator was turned off until the vehicle stopped was measured as the rolling resistance during high-speed running. The larger the value, the longer the distance from when the accelerator is released until the vehicle stops, and the smaller the rolling resistance in the steady state.

Next, taking the result in Example 4-3 as 100, it was indexed based on the following formula to evaluate fuel efficiency. The larger the value, the smaller the rolling resistance in the steady state and the better the fuel efficiency. The results of evaluation are shown in Table 7.

Low fuel consumption=[(measurement result of test tire)/(measurement result of Example 4-3)]×100

Then, as in Experiments 1 to 3, each evaluation result was totaled to obtain a comprehensive evaluation. The results of each evaluation are shown in Table 7.

TABLE 7

| | Example No. | | |
|---|---|---|---|
| | 4-1 | 4-2 | 4-3 |
| SIZE | 175/55R18 | 195/50R19 | 225/45R20 |
| Rubber composition with high thermal conductivity | D | D | D |
| (Parameter) | | | |
| Dt(mm) | 650 | 678 | 709 |
| V(mm³) | 30346008 | 35622714 | 43419514 |
| Wt(mm) | 181 | 200 | 226 |
| Ht(mm) | 97 | 98 | 100 |
| Dt-2 × Ht(mm) | 456 | 482 | 509 |
| $(Dt^2 \times \pi/4)/Wt$ | 1833 | 1805 | 1747 |
| $(V + 1.5 \times 10^7)/Wt$ | 250530 | 253114 | 258493 |
| $(V + 2.0 \times 10^7)/Wt$ | 278155 | 278114 | 280617 |
| $(V + 2.5 \times 10^7)/Wt$ | 305779 | 303114 | 302741 |
| Aspect ratio (%) | 53 | 49 | 44 |
| Ka-Kb | 0.08 | 0.08 | 0.08 |
| Sb-Sa | 90 | 90 | 90 |
| (Sb-Sa) × Wt | 16290 | 18000 | 20340 |
| (Evaluation result) | | | |
| Grip at high-speed running | 109 | 104 | 100 |
| Durability | 105 | 102 | 100 |
| Fuel efficiency | 110 | 105 | 100 |
| Comprehensive evaluation | 324 | 311 | 300 |

From Table 7, when there is no large difference in the relationship between the virtual volume V and the cross-sectional width Wt, as the cross-sectional width Wt becomes smaller as from less than 205 mm to less than 200 mm, and as the aspect ratio increases, it was found that all of the grip during high-speed running, durability and fuel efficiency were improved, and a remarkable effect was exhibited.

Although the present invention has been described above based on the embodiments, the present invention is not limited to the above embodiments. Various modifications can be made to the above embodiments within the same and equal range as the present invention.

What is claimed is:

1. A pneumatic tire having a tread portion, wherein
the tread portion has a ground-contacting surface made of at least two types of rubber compositions having different thermal conductivities,
when the cross-sectional width of the tire is Wt (mm), the outer diameter is Dt (mm), and the volume of the space occupied by the tire is the virtual volume V (mm³), when the tire is installed on a standardized rim and the internal pressure is 250 kPa, the tire satisfies following (formula 1) and (formula 2):

$$1700 \leq (Dt^2 \times \pi/4)/Wt \leq 2827.4 \quad \text{(formula 1)}$$

$$[(V+1.5\times 10^7)/Wt] \leq 2.88\times 10^5 \quad \text{(formula 2)}$$

wherein, when the thermal conductivity of the rubber composition with the highest thermal conductivity is Ka (W/m·K), and the thermal conductivity of the rubber composition with the lowest thermal conductivity is Kb (W/m·K), among the at least two types of rubber compositions having different thermal conductivities, the following (formula 6) is satisfied:

$$0.11 \leq Ka - Kb \leq 0.24 \quad \text{(formula 6)}.$$

2. The pneumatic tire according to claim 1, wherein the following (formula 3) is satisfied:

$$1718 \leq (Dt^2 \times \Pi/4)/Wt \leq 2827.4 \quad \text{(formula 3)}.$$

3. The pneumatic tire according to claim 1, wherein, when the outer diameter of the tire is Dt (mm) and the cross-sectional height of the tire is Ht (mm) when the tire is installed on a standardized rim and the internal pressure is 250 kPa, (Dt−2×Ht) is 470 (mm) or more.

4. The pneumatic tire according to claim 1, wherein the tread portion has a plurality of circumferential grooves continuously extending in the tire circumferential direction, and the total cross-sectional area of the plurality of circumferential grooves is 10 to 30% of the cross-sectional area of the tread portion.

5. The pneumatic tire according to claim 1, wherein the tread portion has a plurality of lateral grooves extending in the tire axial direction, and the total volume of the plurality of lateral grooves is 2.0 to 5.0% of the volume of the tread portion.

6. The pneumatic tire according to claim 1, wherein Dt is less than 685 (mm), where Dt (mm) is the outer diameter of the tire when the tire is installed on a standardized rim and the internal pressure is 250 kPa.

7. The pneumatic tire according to claim 1, which is a pneumatic tire for a passenger car.

8. The pneumatic tire according to claim 1, wherein the following (formula 4) is satisfied:

$$[(V+2.0\times 10^7)/Wt] \leq 2.88\times 10^5 \quad \text{(formula 4)}.$$

9. The pneumatic tire according to claim 8, wherein the following (formula 5) is satisfied:

$$[(V+2.5\times 10^7)/Wt] \leq 2.88\times 10^5 \quad \text{(formula 5)}.$$

10. The pneumatic tire according to claim 1, wherein when the thermal conductivity of the rubber composition with the highest thermal conductivity is Ka (W/m·K), and the thermal conductivity of the rubber composition with the lowest thermal conductivity is Kb (W/m·K), among the at least two types of rubber compositions having different thermal conductivities, in the tread portion, the ratio Sb (%) of the contact area of the contact portion formed from the rubber composition having the thermal conductivity of Kb to the total contact area is larger than the ratio Sa (%) of the contact area of the contact portion formed from the rubber composition having the thermal conductivity of Ka to the total contact area, and (Sb−Sa)×Wt<3.00×10⁴ is satisfied.

11. The pneumatic tire according to claim 10, wherein (Sb−Sa)×Wt<2.50×10⁴ is satisfied.

12. The pneumatic tire according to claim 1, wherein loss tangent (30° C. tan δ) measured under the conditions of 30° C., frequency of 10 Hz, initial strain of 5%, and dynamic strain of 1% for the rubber composition with the lowest thermal conductivity among the at least two types of rubber compositions having different thermal conductivities is 0.16 or less.

13. The pneumatic tire according to claim 12, wherein the 30° C. tan δ is 0.14 or less.

14. The pneumatic tire according to claim 1, wherein, when Td (mm) is the thickness of the tread portion, the following (formula 8) is satisfied:

$$30° \text{ C. tan } \delta \times Td \geq 1.5 \quad \text{(formula 8)}.$$

15. The pneumatic tire according to claim 14, wherein the following (formula 9) is satisfied:

$$30° \text{ C. tan } \delta \times Td \geq 1.8 \quad \text{(formula 9)}.$$

16. The pneumatic tire according to claim 1, wherein the cross-sectional width Wt (mm) is less than 205 mm.

17. The pneumatic tire according claim 16, wherein the cross-sectional width Wt (mm) is less than 200 mm.

18. The pneumatic tire according to claim 1, which has an aspect ratio of 40% or more.

19. The pneumatic tire according to claim 18, which has an aspect ratio of 45% or more.

20. The pneumatic tire according to claim 19, which has an aspect ratio of 47.5% or more.

21. The pneumatic tire according to claim 20, which has an aspect ratio of 50% or more.

* * * * *

UNITED STATES PATENT AND TRADEMARK OFFICE
CERTIFICATE OF CORRECTION

PATENT NO. : 12,275,281 B2  
APPLICATION NO. : 18/017785  
DATED : April 15, 2025  
INVENTOR(S) : K. Hamamura et al.

Page 1 of 1

It is certified that error appears in the above-identified patent and that said Letters Patent is hereby corrected as shown below:

In the Claims

Column 33, Lines 16-17 (Claim 2, Line 3), please change "$\Pi/4$" to -- $\pi/4$ --.

Signed and Sealed this  
Twenty-second Day of July, 2025

Coke Morgan Stewart  
*Acting Director of the United States Patent and Trademark Office*